(12) United States Patent
Cooper (10) Patent No.: US 9,052,000 B2
(45) Date of Patent: Jun. 9, 2015

(54) BALL TYPE CVT/IVT INCLUDING PLANETARY GEAR SETS

(71) Applicant: Dana Limited, Maumee, OH (US)

(72) Inventor: Kenneth E. Cooper, Toledo, OH (US)

(73) Assignee: Dana Limited, Maumee, OH (US)

( * ) Notice: Subject to any disclaimer, the term of this patent is extended or adjusted under 35 U.S.C. 154(b) by 0 days.

(21) Appl. No.: 14/017,054

(22) Filed: Sep. 3, 2013

(65) Prior Publication Data

US 2014/0194242 A1 Jul. 10, 2014

Related U.S. Application Data

(60) Provisional application No. 61/697,912, filed on Sep. 7, 2012, provisional application No. 61/783,853, filed on Mar. 14, 2013.

(51) Int. Cl.
*F16H 37/02* (2006.01)
*F16H 15/50* (2006.01)
*F16H 37/08* (2006.01)
F16H 15/28 (2006.01)
F16H 15/52 (2006.01)

(52) U.S. Cl.
CPC .............. *F16H 15/503* (2013.01); F16H 15/28 (2013.01); F16H 15/52 (2013.01); *F16H 37/0853* (2013.01); F16H 2037/0873 (2013.01); F16H 2037/0893 (2013.01)

(58) Field of Classification Search
CPC ......... F16H 15/50; F16H 15/28; F16H 15/52; F16H 15/503; F16H 37/0853; F16H 2037/0873; F16H 2037/0893

USPC .......................... 475/198, 204, 207, 214–217
See application file for complete search history.

(56) References Cited

U.S. PATENT DOCUMENTS

| 1,063,244 | A | 6/1913 | Dieterich |
| 2,019,006 | A | 10/1935 | Ferrari |
| 2,060,884 | A | 11/1936 | Madle |
| 2,660,897 | A | 12/1953 | Neidhart et al. |
| 2,931,235 | A | 4/1960 | Hayward |

(Continued)

FOREIGN PATENT DOCUMENTS

| AU | 2011224083 A1 | 10/2011 |
| DE | 3245045 A1 | 6/1984 |

(Continued)

OTHER PUBLICATIONS

Moore et al, A Three Revolute Cobot Using CVTs in Parallel, Proceedings of IMECE, 1999, 6 pgs.

(Continued)

*Primary Examiner* — Justin Holmes
(74) *Attorney, Agent, or Firm* — Wilson Sonsini Goodrich & Rosati (57) ABSTRACT

Disclosed herein are power transmissions having one or more operational modes, for example, a continuously variable transmission (CVT) mode, an infinitely variable transmission (IVT) mode, and an IVT/CVT mode, that can be selected for by engaging different clutches and brakes. Disclosed herein are power transmissions comprising a power input shaft, one or more planetary gear sets, a variator (such as a CVT), and one or more clutches and brakes. In some embodiments, a first brake selects an IVT mode, a second brake selects a CVT mode, and a third brake selects an IVT/CVT mode.

27 Claims, 5 Drawing Sheets

(56) References Cited

U.S. PATENT DOCUMENTS

| | | | |
|---|---|---|---|
| 3,203,278 | A | 8/1965 | General |
| 3,470,720 | A | 10/1969 | Eklund et al. |
| 3,831,245 | A | 8/1974 | Amos |
| 3,894,559 | A | 7/1975 | DePuy |
| 4,046,988 | A | 9/1977 | Okuda et al. |
| 4,226,140 | A | 10/1980 | Gaasenbeek |
| 4,464,952 | A | 8/1984 | Stubbs |
| 4,693,134 | A | 9/1987 | Kraus |
| 4,784,017 | A | 11/1988 | Johnshoy |
| 4,856,371 | A | 8/1989 | Kemper |
| 4,856,374 | A | 8/1989 | Kreuzer |
| 4,963,122 | A | 10/1990 | Ryan |
| 4,963,124 | A | 10/1990 | Takahashi et al. |
| 5,230,670 | A | 7/1993 | Hibi |
| 5,238,460 | A * | 8/1993 | Esaki et al. ............... 475/192 |
| 5,318,486 | A | 6/1994 | Lutz |
| 5,401,221 | A | 3/1995 | Fellows et al. |
| 5,520,588 | A | 5/1996 | Hall, III |
| 5,577,423 | A | 11/1996 | Mimura |
| 5,599,251 | A | 2/1997 | Beim et al. |
| 5,726,353 | A | 3/1998 | Matsuda et al. |
| 5,730,678 | A | 3/1998 | Larkin |
| 5,776,028 | A | 7/1998 | Matsuda et al. |
| 5,800,303 | A | 9/1998 | Benford |
| 5,860,888 | A | 1/1999 | Lee |
| 5,971,883 | A | 10/1999 | Klemen |
| 5,996,226 | A | 12/1999 | Gibbs |
| 6,045,477 | A | 4/2000 | Schmidt |
| 6,053,839 | A | 4/2000 | Baldwin et al. |
| 6,059,685 | A | 5/2000 | Hoge et al. |
| 6,071,208 | A | 6/2000 | Koivunen |
| 6,083,135 | A | 7/2000 | Baldwin et al. |
| 6,086,504 | A | 7/2000 | Illerhaus |
| 6,089,287 | A | 7/2000 | Welsh et al. |
| 6,155,951 | A | 12/2000 | Kuhn et al. |
| 6,217,474 | B1 | 4/2001 | Ross et al. |
| 6,251,038 | B1 | 6/2001 | Ishikawa et al. |
| 6,273,838 | B1 | 8/2001 | Park |
| 6,342,026 | B1 | 1/2002 | Takagi et al. |
| 6,358,178 | B1 | 3/2002 | Wittkopp |
| 6,371,880 | B1 | 4/2002 | Kam |
| 6,554,735 | B2 | 4/2003 | Kanazawa |
| 6,558,285 | B1 | 5/2003 | Sieber |
| 6,585,619 | B2 | 7/2003 | Henzler |
| 6,641,497 | B2 | 11/2003 | Deschamps et al. |
| 6,705,964 | B2 | 3/2004 | Nagai et al. |
| 6,719,659 | B2 | 4/2004 | Geiberger et al. |
| 6,723,016 | B2 | 4/2004 | Sumi |
| 6,726,590 | B2 | 4/2004 | Henzler et al. |
| 6,733,412 | B2 | 5/2004 | Kumagai et al. |
| 6,793,603 | B2 | 9/2004 | Teraoka et al. |
| 6,849,020 | B2 | 2/2005 | Sumi |
| 6,866,606 | B2 | 3/2005 | Ooyama |
| 6,949,045 | B2 | 9/2005 | Wafzig et al. |
| 6,979,275 | B2 | 12/2005 | Hiraku et al. |
| 7,033,298 | B2 | 4/2006 | Usoro et al. |
| 7,074,154 | B2 | 7/2006 | Miller |
| 7,104,917 | B2 | 9/2006 | Klemen et al. |
| 7,128,681 | B2 | 10/2006 | Sugino et al. |
| 7,160,220 | B2 | 1/2007 | Shinojima et al. |
| 7,186,199 | B1 | 3/2007 | Baxter, Jr. |
| 7,234,543 | B2 | 6/2007 | Schaaf |
| 7,288,044 | B2 | 10/2007 | Gumpoltsberger |
| 7,335,126 | B2 | 2/2008 | Tsuchiya et al. |
| 7,347,801 | B2 | 3/2008 | Guenter et al. |
| 7,396,309 | B2 | 7/2008 | Heitz et al. |
| 7,470,210 | B2 | 12/2008 | Miller et al. |
| 7,473,202 | B2 | 1/2009 | Morscheck et al. |
| 7,485,069 | B2 | 2/2009 | Jang et al. |
| 7,497,798 | B2 | 3/2009 | Kim |
| 7,637,838 | B2 | 12/2009 | Gumpoltsberger |
| 7,686,729 | B2 | 3/2010 | Miller et al. |
| 7,717,815 | B2 | 5/2010 | Tenberge |
| 7,727,107 | B2 | 6/2010 | Miller |
| 7,780,566 | B2 | 8/2010 | Seo |
| 7,878,935 | B2 | 2/2011 | Lahr |
| 7,951,035 | B2 * | 5/2011 | Platt ............................. 475/205 |
| 7,980,972 | B1 | 7/2011 | Starkey et al. |
| 8,029,401 | B2 | 10/2011 | Johnson |
| 8,066,614 | B2 | 11/2011 | Miller et al. |
| 8,142,323 | B2 | 3/2012 | Tsuchiya et al. |
| 8,226,518 | B2 | 7/2012 | Parraga |
| 8,257,216 | B2 | 9/2012 | Hoffman |
| 8,257,217 | B2 | 9/2012 | Hoffman |
| 8,287,414 | B2 | 10/2012 | Weber et al. |
| 8,313,404 | B2 | 11/2012 | Carter et al. |
| 8,382,636 | B2 | 2/2013 | Shiina et al. |
| 8,870,711 | B2 * | 10/2014 | Pohl et al. ....................... 477/37 |
| 8,888,643 | B2 * | 11/2014 | Lohr et al. ................... 475/189 |
| 2002/0094911 | A1 | 7/2002 | Haka |
| 2002/0169048 | A1 | 11/2002 | Henzler et al. |
| 2003/0060318 | A1 | 3/2003 | Sumi |
| 2003/0181280 | A1 | 9/2003 | Elser et al. |
| 2003/0216121 | A1 | 11/2003 | Yarkosky |
| 2003/0228952 | A1 | 12/2003 | Joe et al. |
| 2004/0058769 | A1 | 3/2004 | Larkin |
| 2004/0061639 | A1 | 4/2004 | Voigtlaender et al. |
| 2004/0166984 | A1 | 8/2004 | Inoue |
| 2004/0171452 | A1 | 9/2004 | Miller et al. |
| 2005/0102082 | A1 | 5/2005 | Joe et al. |
| 2005/0137046 | A1 | 6/2005 | Miller et al. |
| 2005/0153810 | A1 | 7/2005 | Miller et al. |
| 2006/0234822 | A1 | 10/2006 | Morscheck et al. |
| 2007/0021259 | A1 | 1/2007 | Tenberge |
| 2007/0032327 | A1 | 2/2007 | Raghavan et al. |
| 2007/0042856 | A1 | 2/2007 | Greenwood |
| 2007/0072732 | A1 | 3/2007 | Klemen |
| 2007/0270270 | A1 | 11/2007 | Miller et al. |
| 2007/0275808 | A1 | 11/2007 | Iwanaka et al. |
| 2008/0039273 | A1 | 2/2008 | Smithson et al. |
| 2008/0103002 | A1 | 5/2008 | Holmes |
| 2008/0121487 | A1 | 5/2008 | Miller et al. |
| 2008/0185201 | A1 | 8/2008 | Bishop |
| 2009/0017959 | A1 | 1/2009 | Triller |
| 2009/0048054 | A1 | 2/2009 | Tsuchiya et al. |
| 2009/0062064 | A1 | 3/2009 | Kamada et al. |
| 2009/0221391 | A1 | 9/2009 | Bazyn et al. |
| 2009/0221393 | A1 | 9/2009 | Kassler |
| 2009/0286651 | A1 | 11/2009 | Tanaka et al. |
| 2009/0312137 | A1 | 12/2009 | Rohs et al. |
| 2010/0056322 | A1 | 3/2010 | Thomassy |
| 2010/0093476 | A1 | 4/2010 | Carter et al. |
| 2010/0093479 | A1 | 4/2010 | Carter et al. |
| 2010/0113211 | A1 | 5/2010 | Schneider et al. |
| 2010/0141193 | A1 | 6/2010 | Rotondo et al. |
| 2010/0244755 | A1 | 9/2010 | Kinugasa et al. |
| 2010/0267510 | A1 | 10/2010 | Nichols et al. |
| 2010/0282020 | A1 | 11/2010 | Greenwood et al. |
| 2010/0304915 | A1 | 12/2010 | Lahr |
| 2011/0015021 | A1 | 1/2011 | Maguire et al. |
| 2011/0034284 | A1 | 2/2011 | Pohl et al. |
| 2011/0152031 | A1 | 6/2011 | Schoolcraft |
| 2011/0165982 | A1 | 7/2011 | Hoffman et al. |
| 2011/0165985 | A1 | 7/2011 | Hoffman et al. |
| 2011/0165986 | A1 | 7/2011 | Hoffman et al. |
| 2011/0230297 | A1 | 9/2011 | Shiina et al. |
| 2011/0319222 | A1 | 12/2011 | Ogawa et al. |
| 2012/0024991 | A1 | 2/2012 | Pilch et al. |
| 2012/0035016 | A1 | 2/2012 | Miller et al. |
| 2012/0040794 | A1 | 2/2012 | Schoolcraft |
| 2012/0122624 | A1 | 5/2012 | Hawkins, Jr. et al. |
| 2012/0142477 | A1 | 6/2012 | Winter |
| 2012/0165154 | A1 | 6/2012 | Wittkopp et al. |
| 2012/0231925 | A1 | 9/2012 | Shiina et al. |
| 2012/0244990 | A1 | 9/2012 | Ogawa et al. |
| 2012/0309579 | A1 | 12/2012 | Miller et al. |
| 2013/0130859 | A1 | 5/2013 | Lundberg et al. |
| 2013/0190131 | A1 | 7/2013 | Versteyhe et al. |
| 2013/0303325 | A1 | 11/2013 | Carey et al. |
| 2014/0194243 | A1 | 7/2014 | Versteyhe et al. |
| 2014/0274536 | A1 | 9/2014 | Versteyhe et al. |
| 2014/0274552 | A1 | 9/2014 | Frink et al. |
| 2015/0024899 | A1 | 1/2015 | Versteyhe et al. |

(56) References Cited

U.S. PATENT DOCUMENTS

FOREIGN PATENT DOCUMENTS

| | | |
|---|---|---|
| DE | 102005010751 | 9/2006 |
| EP | 0210053 A2 | 7/1985 |
| EP | 1061288 | 12/2000 |
| EP | 2113056 | 7/2012 |
| FR | 1030702 | 6/1953 |
| FR | 2918433 | 1/2009 |
| GB | 2248895 A2 | 4/1992 |
| JP | H-09-119506 | 5/1997 |
| JP | 2008-180214 | 8/2008 |
| WO | WO2006/002457 | 1/2006 |
| WO | WO2006/041718 | 4/2006 |
| WO | WO2007/046722 | 4/2007 |
| WO | WO2007/051827 | 5/2007 |
| WO | WO2008/103543 | 8/2008 |
| WO | WO2011/011991 | 2/2011 |
| WO | WO2012/008884 | 1/2012 |
| WO | WO2013/109723 | 7/2013 |
| WO | WO2013/123117 | 8/2013 |
| WO | WO2014/039438 | 3/2014 |
| WO | WO2014/039439 | 3/2014 |
| WO | WO2014/039440 | 3/2014 |
| WO | WO2014/039447 | 3/2014 |
| WO | WO2014/039448 | 3/2014 |
| WO | WO2014/039708 | 3/2014 |
| WO | WO2014/039713 | 3/2014 |
| WO | WO2014/039846 | 3/2014 |
| WO | WO2014/039900 | 3/2014 |
| WO | WO2014/039901 | 3/2014 |
| WO | WO2014/078583 | 5/2014 |
| WO | WO2014/151889 | 9/2014 |
| WO | WO2014/159755 | 10/2014 |
| WO | WO2014/159756 | 10/2014 |
| WO | WO2014/165259 | 10/2014 |
| WO | WO2014/179717 | 11/2014 |
| WO | WO2014/179719 | 11/2014 |
| WO | WO2014/186732 | 11/2014 |
| WO | WO2014/197711 | 12/2014 |

OTHER PUBLICATIONS

PCT/US2013/021890 International Search Report dated Apr. 10, 2013.
PCT/US2013/026037 International Search Report dated Jul. 15, 2013.
PCT/US2013/057837 International Search Report and Written Opinion dated Mar. 31, 2014.
PCT/US2013/057866 International Search Report dated Feb. 11, 2014.
PCT/US2013/058309 International Search Report and Written Opinion dated Feb. 11, 2014.
PCT/US2013/058318 International Search Report and Written Opinion dated Feb. 11, 2014.
PCT/US2013/058545 International Search Report and Written Opinion dated Feb. 19, 2014.
PCT/US2013/058616 International Search Report and Written Opinion dated Feb. 11, 2014.
PCT/US2013/070177 International Search Report and Written Opinion dated Apr. 14, 2014.
PCT/US2013/57838 International Search Report and Written Opinion dated Jan. 17, 2014.
PCT/US2013/57839 International Search Report and Written Opinion dated Feb. 6, 2014.
PCT/US2013/57868 International Search Report and Written Opinion dated Apr. 9, 2014.
PCT/US2013/58615 International Search Report and Written Opinion dated Feb. 11, 2014.
PCT/US2014/25001 International Search Report and Written Opinion dated Jul. 14, 2014.
PCT/US2014/25005 International Search Report and Written Opinion dated Jul. 14, 2014.
PCT/US2014/25004 International Search Report and Written Opinion dated Jul. 14, 2014.
U.S. Appl. No. 61/819,414, filed May 3, 2013, Philips et al.
Fallbrook Technologies. 'NuVinci® Technology', Feb. 26, 2013; [retrieved on Jun. 5, 2014]. Retrieved from internet: <URL: https://web.archive.org/web/20130226233109/http://www.fallbrooktech.com/nuvinci-technology.
PCT/US2013/026037 International Preliminary Report on Patentability dated Aug. 28, 2014.
PCT/US2014/036623 International Search Report and Written Opinion dated Sep. 4, 2014.
PCT/US2014/26619 International Search Report and Written Opinion dated Sep. 9, 2014.
PCT/US2014/036621 International Search Report and Written Opinion dated Sep. 4, 2014.
PCT/US2014/038439 International Search Report and Written Opinion dated Sep. 30, 2014.
PCT/US2014/041124 International Search Report and Written Opinion dated Oct. 15, 2014.
Wong. The Temple of VTEC Asia Special Focus on the Multimatic Transmission. Temple of VTEC Asia. 2000.
PCT/US2014/065909 International Search Report and Written Opinion dated Feb. 19, 2015.
PCT/US2014/65792 International Search Report and Written Opinion dated Apr. 9, 2015.
PCT/US2014/65796 International Search Report and Written Opinion dated Apr. 9, 2015.

* cited by examiner

FIG. 1

| $r_i > r_o$ | $r_i = r_o$ | $r_i < r_o$ |
| --- | --- | --- |
| Underdrive | 1:1 | Overdrive |

BALL TYPE CVT/IVT INCLUDING PLANETARY GEAR SETS

CROSS-REFERENCE

This application claims the benefit of U.S. Provisional Application No. 61/697,912, filed Sep. 7, 2012 and U.S. Provisional Application No. 61/783,853, filed Mar. 14, 2013, which applications are incorporated herein by reference.

BACKGROUND OF THE INVENTION

Automatic and manual transmissions are commonly used on automobile vehicles. Such transmissions have become more and more complicated since the engine speed has to be adjusted to limit the consumption and the emissions of the vehicle. The finer control of the engine speed in usual transmissions can typically only be accomplished by adding gears and increasing the overall complexity and cost. As a result, 6-speed manual transmissions have become as frequent as 8 or 9 speed automatic transmissions.

SUMMARY OF THE INVENTION

Systems, devices, and methods are provided for transmitting power in a smoother and more efficient manner, preferably with less or smaller components. In some embodiments, power transmissions disclosed herein have one or more operational modes, e.g., a continuously variable transmission (CVT) mode, an infinitely variable transmission (IVT) mode, and an IVT/CVT mode. In some embodiments, the operational modes are selected for by engaging different clutches and/or brakes.

Described herein, in certain embodiments, is an apparatus for power transmission. In some embodiments, the power transmission apparatus comprises a power input shaft, one or more planetary gear sets, a variator, and one or more clutches and brakes (also called brake clutches). In some embodiments, a first planetary gear set is mechanically coupled to the power input shaft. In some embodiments, the variator is mechanically coupled to the some of the planetary gear sets. In some embodiments, the one or more clutches and brakes are to be used for switching among a plurality of operational modes of the power transmission apparatus.

In some embodiments, the components of the power transmission have various configurations and comprise a variety of different types of parts. In some embodiments, the one or more clutches and brakes are configured to be selectively engaged or released to switch between the modes of the power transmission apparatus. In some embodiments, the gear set comprises a ravigneaux-like gear set, a dual sun planetary gear set, or a three sun planetary gear set. In some embodiments, the variator is coupled to a sun, a ring or a planet carrier of the planetary gear set. In some embodiments, the variator comprises a continuously variable transmission (CVT), such as a fraction type, also known as ball-type CVT. In some embodiments, the power transmission further comprises a first and second ball ramp disposed on either side of the variator for providing a clamping force for torque transfer. In some embodiments, the power input shaft is coupled to a damper and the output of an internal combustion engine.

In some embodiments, the one or more clutches and brakes comprises a first clutch or brake for selecting an infinitely variable transmission (IVT) mode of the power transmission apparatus. In some embodiments, the first clutch or brake is configured to couple to an output of a planet gear of the gear set. In some embodiments, the one or more clutches or brakes comprises a second clutch or brake for selecting a continuously variable transmission (CVT) mode of the power transmission apparatus. In some embodiments, the second clutch or brake is configured to couple to an output of a sun gear of the gear set. In some embodiments, the one or more clutches or brake comprises a third clutch or brake for selecting an infinitely and continuously variable transmission (IVT/CVT) mode of the power transmission apparatus. In some embodiments, the third clutch or brake is configured to couple to a ring gear or a sun of the gear set. In some embodiments, the one or more clutches comprises an overdrive clutch or brake for affecting a speed increase. In some embodiments, the one or more clutches comprise a direct drive clutch.

In some embodiments, the power transmission apparatus further comprises a power output mechanically coupled to the variator. In some embodiments, the power output comprises a power output ring for transmitting power from the variator to a differential box. In some embodiments, the power output comprises a power output shaft, In some embodiments, the power transmission further comprises an output gear set mechanically coupled to the power output shaft for transmitting power from the variator to a differential box.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Automatic and manual transmissions commonly used on automobile vehicles are Continuously Variable Transmissions or CVTs. Such CVTs include many types, such as belts with variable pulleys, toroidal, and conical. The principle of a CVT is that it enables the engine to run at its most efficient rotation speed by changing steplessly the transmission ratio in function of the speed of the vehicle. If needed, for example, when accelerating, the CVT can also shift to a ratio providing more power. A CVT can change the ratio from the minimum to the maximum ratio without any interruption of the power transmission, at the opposite of usual transmissions which require an interruption of the power transmission by disengaging to shift of ratio. A specific use of CVTs is the Infinite Variable Transmission or IVT. Where the CVT is limited at positive speed ratios, the IVT configuration can perform a neutral gear and even reverse steplessly. A CVT can be used as an IVT in some driveline configurations.

Figure 1:
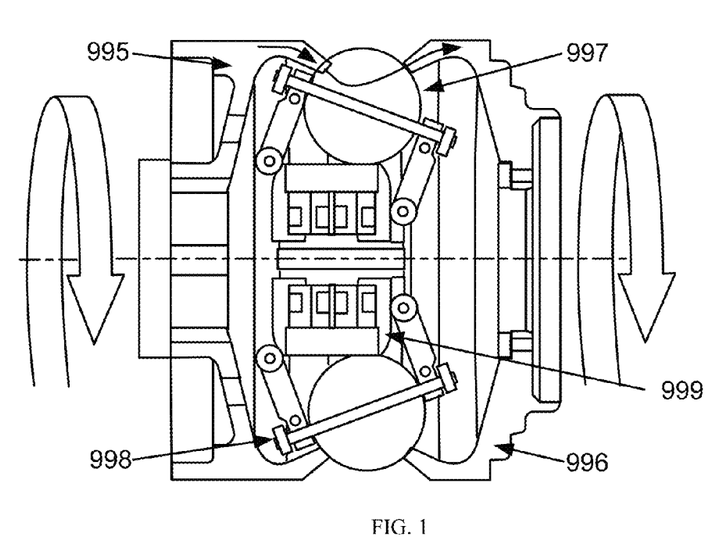
FIG. 1 is a cutaway view of a currently known and used continuously variable transmission (CVT)

Described herein are driveline configurations based on a ball type CVT, also known as CVP (Constant Variable Planetary), for which patents were applied for by Fallbrook Technologies, Inc. under the references US20040616399P and AU2011224083A1. This CVT is composed of a certain number of balls, depending on the application, two discs with a conical surface contact with the balls, as input 995 and output 996, and an idler 999 as shown in FIG. 1. The balls 997 are mounted on axles 998, themselves held in a cage or carrier allowing changing the ratio by tilting the ball's axles. Other types of ball CVTs also exist, including the Milner Continuous Variable Transmission (MCVT) (MCVT).

Figure 2:
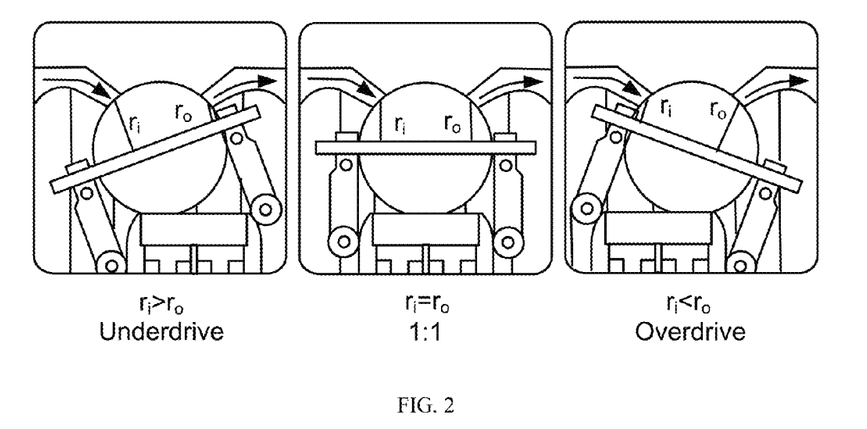
FIG. 2 is a magnified cutaway view of a ball and ring of the CVP of FIG. 1.

The working principle is shown on FIG. 2. The CVP itself works with a traction fluid. The lubricant between the ball and the conical rings acts as a solid at high pressure, transferring the power from the input ring, through the balls, to the output ring. By tilting the ball's axis, the ratio can be changed between input and output. When the axis is horizontal the ratio is one, when the axis is tilted the distance between the axis and the contact point change, modifying the overall ratio. All the ball's axes are tilted at the same time with a mechanism included in the cage.

Figure 3:
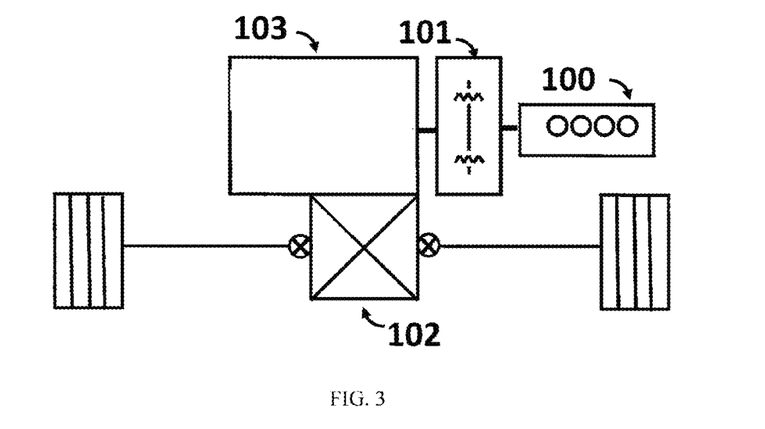
FIG. 3 is a block diagram of a transmission based on CVP of FIG. 1 as used in a motor vehicle transmission.

In an automobile, the CVT 103 is used to replace a traditional transmission and is located between the engine 100 and the differential 102 as shown on FIG. 3. In some instances, a torsional damper 101 is introduced between the engine 100 and the CVT 103 to avoid transferring torque peaks and vibrations that could seriously damage the CVT. In some configurations, this damper 101 is coupled with a clutch for the starting function.

In some instances, the continuously variable transmission (CVT) is less than ideal. Power ratios may not be the most effective and efficient, power transmission may be frequently interrupted, and the transmissions may involve the use of bulky and heavy parts. Therefore, improved continuously variable transmissions (CVT) overcoming at least some of these problems are desired.

Systems, devices, and methods are provided for transmitting power in a smoother and more efficient manner. In some embodiments, this is accomplishs with fewer or smaller components. In some embodiments, power transmissions disclosed herein have one or more operational modes, e.g., a continuously variable transmission (CVT) mode, an infinitely variable transmission (IVT) mode, and an IVT/CVT mode, that are selected for by engaging different clutches or brakes. In some embodiments, the apparatus allows for mode shifting between the continuously variable (CVT) mode and infinitely variable (IVT) mode with a minimum number of clutches and brakes.

Concept 1c/

In an automobile 20, the CVT 203 is used to replace a traditional transmission and is located between the engine 200 and the differential 202. In some instances, a torsional damper 201 is introduced between the engine 200 and planetary gears 211 and 212 as shown on FIG. 4. Configuration 1c/ (FIG. 4) uses a dual sun planetary 211 and 212 before going to the variator 213. In the dual sun planetary, the planets of first plane of gears planetary 211 of second plane of gears planetary 212 are made of a single piece. In some embodiments, the variator output is linked to an additional planetary 217. In some embodiments, this planetary is locked to turn with a 1:1 ratio by applying the clutch 216 to lock its sun and planet carrier together. In some embodiments, a speed increase is achieved by having more spread by applying the overdrive clutch 216 to lock the sun of the planetary to the ground. In some embodiments, the ring of this planetary is then linked to the final drive 222 and differential 202. In some embodiments, the second ring of the variator is linked to the planet carrier of the third planetary. In some embodiments, the configuration comprises two brakes, one for IVT mode 214 and one for CVT mode 215. In some embodiments, the central part of that configuration comprises the variator described above. In some embodiments, a ball ramp on each side of the variator provides the clamping force necessary to transfer the torque.

Figure 4:
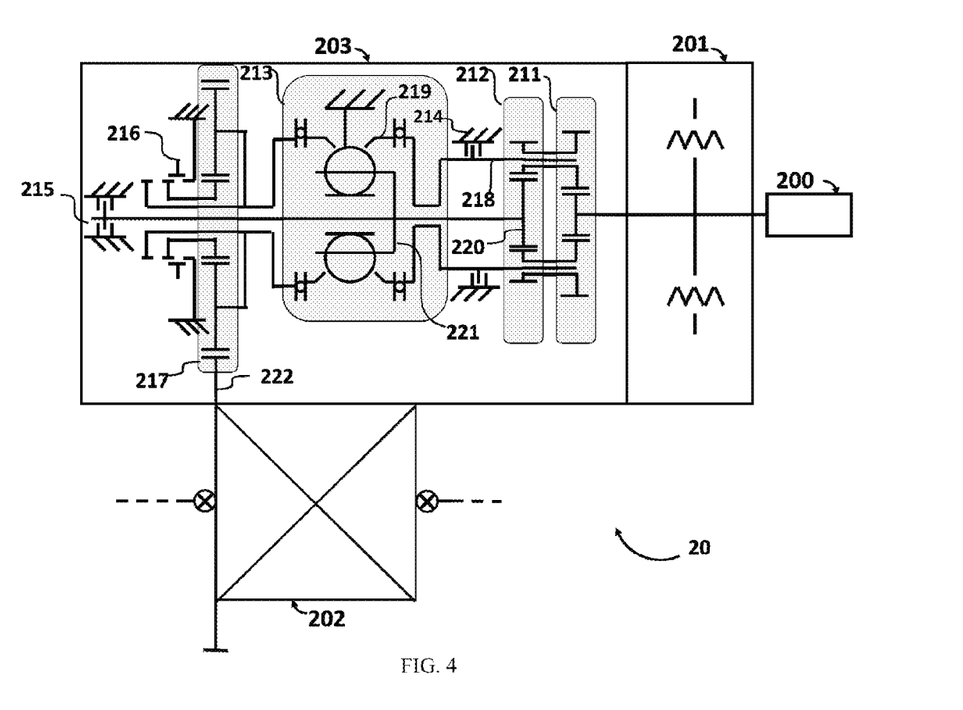
FIG. 4 is a block diagram of a multi-mode transmission according to an embodiment of the present disclosure.

In some embodiments, the carrier 218 of the dual sun planetary is linked to the variator input ring 219. In some embodiments, the carrier 218 of the dual sun planetary is connected to the housing in IVT mode by applying the IVT clutch 214. In some embodiments, the sun of the second planetary 220 is linked to the carrier of the variator 221. In some embodiments, the sun of the second planetary 220 is connected to the housing in CVT mode by applying the CVT clutch 215. In some embodiments, the overall ratio is typically the product of the dual sun planetary ratio, the variator ratio, the output planetary 217 ratio and the final drive ratio 222. In some embodiments, standstill, very low vehicle speeds and reverse is achieved by the IVT mode of the variator.

In some embodiments, the transition between the two modes (CVT and IVT) is simply done by releasing one brake and closing the other. Furthermore, the clutch 216 of the output planetary might be used to select a ratio 1:1 in the output planetary 217 or an overdrive ratio. The transition between these two additional ratios is simply done by changing the parts engaged by the clutch 216. In some embodiments, this device is able to change continuously its ratio to provide the best ratio achievable for the engine in function of the objectives of consumption or power. In certain instances, in a manual or automatic transmission, only some predetermined and discrete ratios are available and an interruption of the power transmission is needed to shift the ratio. In certain instances, the only interruption of power in this device is to change modes. Other advantages include, but are not limited to: a small final drive (in one step, not needing a countershaft) and cost effectiveness of the system. In some embodiments, spread is higher than traditional gearboxes by adding the third planetary, which improves global efficiency of the vehicle. In some embodiments, the apparatus allows for mode shifting between the continuously variable (CVT) mode and infinitely variable (IVT) mode with a minimum number of brakes.

Concept 1d/

In an automobile 30, the CVT 303 is used to replace a traditional transmission and is located between the engine 300 and the differential 302. In some instances, a torsional damper 301 is introduced between the engine 300 and planetary gears 311, 312 and 313 as shown on FIG. 5. Configuration 1d/ (FIG. 5) uses a three sun planetary 311, 312 and 313 before going to the variator 314. In the three sun planetary, the planets of first plane of gears (planetary 311) of second plane of gears (planetary 312) and third plane of gears (planetary 313) are made of a single piece. In some embodiments, the variator output ring 320 is then linked to the final drive 322 and differential. In some embodiments, the configuration comprises three brake clutches, one for IVT mode 315; one for CVT mode 316 and one for an IVT/CVT mode 317 where the variator input ring 319 and the variator carrier 321 are both driven. In some embodiments, the central part of this configuration is the variator described above. In some embodiments, a ball ramp on each side of the variator provides the clamping force necessary to transfer the torque.

Figure 5:
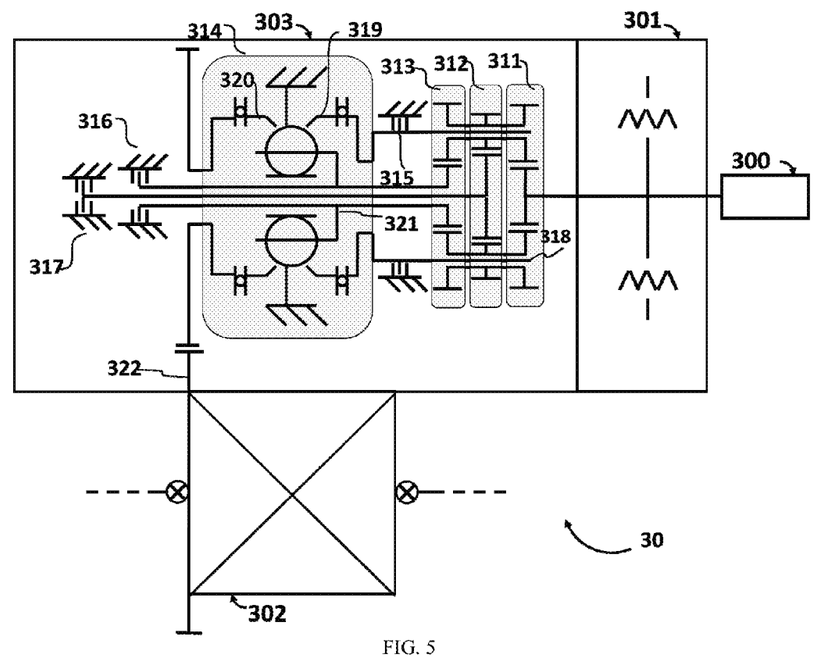
FIG. 5 is a block diagram of a multi-mode transmission according to another embodiment of the present disclosure.

In some embodiments, the carrier 318 of the three sun planetary is linked to the variator input ring 319. In some embodiments, the carrier 318 is connected to the housing in IVT mode by applying a brake 315. In some embodiments, the sun of the third planetary 313 is linked to the carrier of the variator 321. In some embodiments, the sun of the third planetary 313 is connected to the housing in CVT mode by applying brake 316. In some embodiments, in IVT/CVT mode, the sun of the second planetary is connected to the housing by applying brake 317, thus letting the variator input ring 319 and variator carrier 321 be both driven. In some embodiments, this IVT/CVT mode lies in-between the IVT mode and the CVT mode concerning speeds. In some embodiments, the overall ratio is the product of the three sun planetary ratio, the variator ratio and the final drive ratio. In some embodiments, standstill, very low vehicle speeds and reverse are typically achieved by the IVT mode of the variator.

In some embodiments, the transition between the three modes is simply done by engaging one brake and releasing the others. In some embodiments, this device is able to change continuously its ratio to provide the best ratio achievable for the engine in function of the objectives of consumption or power in a manual or automatic transmission. In certain instances, in a manual or automatic transmission, only some predetermined and discrete ratios are available and an interruption of the power transmission is needed to shift the ratio. In some embodiments, the only interruption of power in this device is to change modes. In some embodiments, another advantage is that spread is higher than traditional gearboxes by having those three modes, which can improve global efficiency of the vehicle. In some embodiments, the apparatus allows for mode shifting between the continuously variable (CVT) mode, infinitely variable (IVT) mode and the combined IVT/CVT mode with a minimum number of brakes.

Concept 1e/

In an automobile 40, the CVT 403 is used to replace a traditional transmission and is located between the engine 400 and the differential 402. In some instances, a torsional damper 401 is introduced between the engine 400 and ravigneaux-like planetary 411 as shown on FIG. 6. Configuration 1e/ (FIG. 6) uses a ravigneaux-like planetary 411 before going to the variator 412. In the Ravigneaux-like planetary, the planets of first plane of gears and of second plane of gears are made of a single piece. In some embodiments, the variator output ring 420 is then linked to the final drive 422 and differential. In some embodiments, the configuration comprises three brake clutches, one for IVT mode 413; one for CVT mode 414, and one for an IVT/CVT mode 415 where the variator input ring 419 and the variator carrier 421 are both driven. In some embodiments, the central part of that configuration is the variator described above. In some embodiments, a ball ramp on each side of the variator provides the clamping force necessary to transfer the torque.

Figure 6:
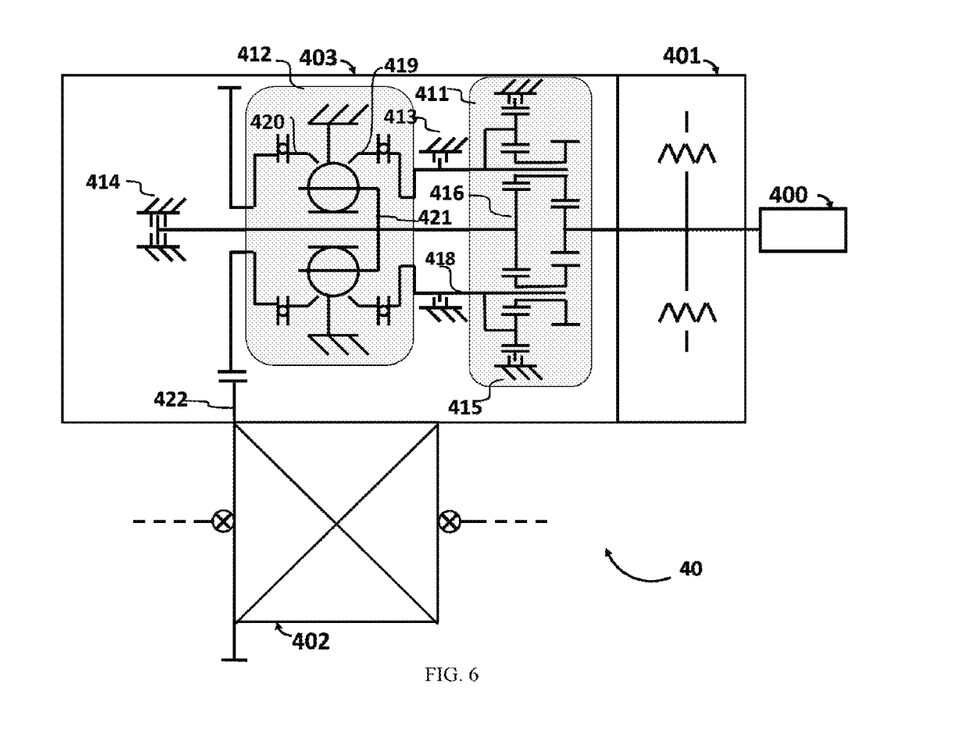
FIG. 6 is a block diagram of a multi-mode transmission according to yet another embodiment of the present disclosure.

In some embodiments, the carrier 418 of the ravigneaux-like planetary is linked to the variator input ring 419. In some embodiments, the carrier 418 is connected to the housing in IVT mode by applying brake 413. In some embodiments, the sun 416 of the second plane of gear of the Ravigneaux planetary 411 is linked to the carrier of the variator 421. In some embodiments, the sun 416 is connected to the housing in CVT mode by applying brake 414. In some embodiments, in IVT/ CVT mode, the ring of the planetary system 411 is connected to the housing by applying brake 415, thus letting the variator input ring 419 and variator carrier 421 be both driven. In some embodiments, this IVT/CVT mode lies in-between the IVT mode and the CVT mode concerning speeds. In some embodiments, the overall ratio is the product of the ravigneaux-like planetary ratio, the variator ratio and the final drive ratio. In some embodiments, standstill, very low vehicle speeds and reverse are achieved by the IVT mode of the variator.

In some embodiments, the transition between the three modes is simply done by engaging one clutch and releasing the other. In some embodiments, this device is able to change continuously its ratio to provide the best ratio achievable for the engine in function of the objectives of consumption or power. In certain instances, in a manual or automatic transmission, only some predetermined and discrete ratios are available and an interruption of the power transmission is needed to shift the ratio. In some embodiments, the only interruption of power in this device is to change modes. In some embodiments, another advantage is that spread is higher than traditional gearboxes by having those three modes, which improves efficiency. In some embodiments, another advantage is that the ravigneaux-like planetary is a compact system. In some embodiments, the apparatus allows for mode shifting between the continuously variable (CVT) mode, infinitely variable (IVT) and the combined IVT/CVT mode with a minimum number of brakes.

Concept 1f/

In an automobile 50, the CVT 503 is used to replace a traditional transmission and is located between the engine 500 and the differential 502. In some instances, a torsional damper 501 is introduced between the engine 500 and ravigneaux-like planetary 511 as shown on FIG. 7. Configuration 1f/ (FIG. 7) uses a ravigneaux-like planetary 511 before going to the variator 512. In some embodiments, the variator output ring 520 is then linked to the final drive 522 and differential. In some embodiments, the configuration comprises three brake clutches, one for IVT mode 513; one for CVT mode 514, and one for an IVT/CVT mode 515 where the variator input ring 519 and the variator carrier 521 are both driven. In some embodiments, the central part of that configuration is the variator described above. In some embodiments, a ball ramp on each side of the variator provides the clamping force necessary to transfer the torque.

Figure 7:
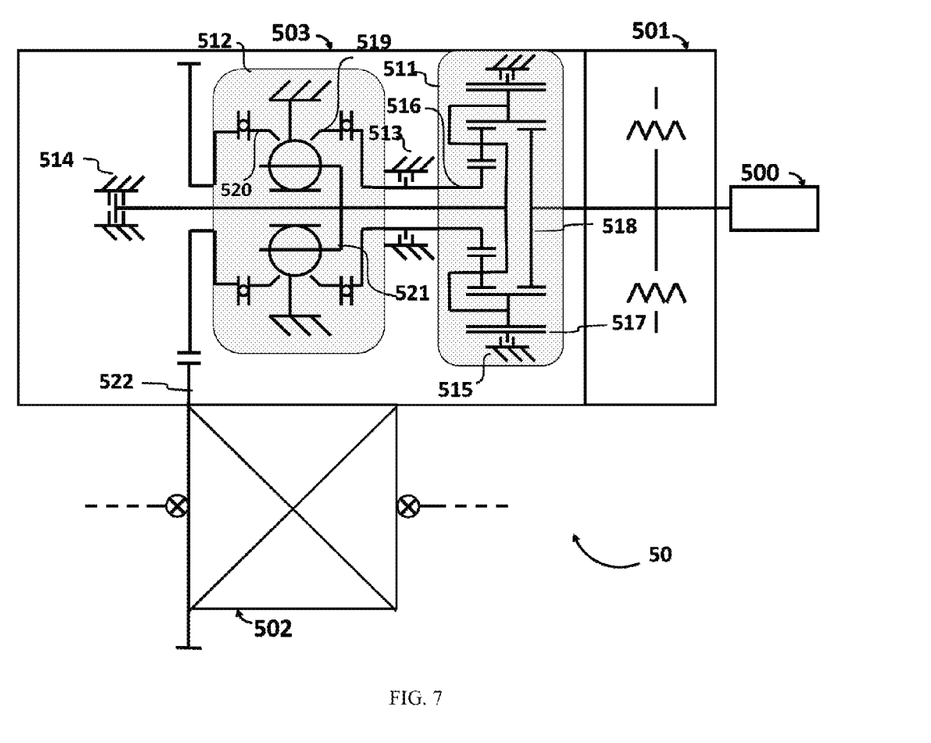
FIG. 7 is a block diagram of a multi-mode transmission according to a further embodiment of the present disclosure.

In some embodiments, the output 516 sun of the ravigneaux-like planetary 511 is linked to the variator input ring 519. In some embodiments, the output 516 sun is connected to the housing in IVT mode by applying brake 513. In some embodiments, the carrier 518 of that system 511 is then linked to the carrier of the variator. In some embodiments, the carrier 518 is connected to the housing in CVT mode by applying brake 514. In some embodiments, in IVT/CVT mode, the ring 517 of the planetary system 511 is connected to the housing by applying brake 515, thus letting the variator input ring 519 and variator carrier 521 be both driven. In some embodiments, this IVT/CVT mode lies in-between the IVT mode and the CVT mode concerning speeds. In some embodiments, the overall ratio is the product of the ravigneaux-like planetary ratio, the variator ratio and the final drive ratio. In some embodiments, standstill, very low vehicle speeds and reverse are achieved by the IVT mode of the variator.

In some embodiments, the transition between the three modes is simply done by engaging one brake and releasing the others. In some embodiments, this device is able to change continuously its ratio to provide the best ratio achievable for the engine in function of the objectives of consumption or power. In certain instances, in a manual or automatic transmission, only some predetermined and discrete ratios are available and an interruption of the power transmission is needed to shift the ratio. In some embodiments, the only interruption of power in this device is to change modes. In some embodiments, another advantage is that spread is higher than traditional gearboxes by having those three modes, which improves efficiency. In some embodiments, another advantage is that the ravigneaux-like planetary is a compact system. In some embodiments, the apparatus allows for mode shifting between the continuously variable (CVT) mode, infinitely variable (IVT) and the combined IVT/CVT mode with a minimum number of brakes.

Embodiments of the variable transmission described herein or that would be obvious to one of skill in the art upon reading the disclosure herein are contemplated for use in a variety of vehicle drivelines. For non-limiting example, the variable transmissions disclosed herein may be used in bicycles, mopeds, scooters, motorcycles, automobiles, electric automobiles, trucks, sport utility vehicles (SUV's), lawn mowers, tractors, harvesters, agricultural machinery, all-terrain vehicles (ATV's), jet skis, personal watercraft vehicles, airplanes, trains, helicopters, buses, forklifts, golf carts, motorships, steam powered ships, submarines, space craft, or other vehicles that employ a transmission.

While the figures and description herein are directed to ball-type variators (CVTs), alternate embodiments are contemplated another version of a variator (CVT), such as a Variable-diameter pulley (VDP) or Reeves drive, a toroidal or roller-based CVT (Extroid CVT), a Magnetic CVT or mCVT, Ratcheting CVT, Hydrostatic CVTs, Naudic Incremental CVT (iCVT), Cone CVTs, Radial roller CVT, Planetary CVT, or any other version CVT.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A power transmission apparatus comprising:
   a power input shaft;
   a first planetary gear set coaxially located and mechanically coupled to the power input shaft;
   a variator coaxially located and mechanically coupled to the first planetary gear set; and
   one or more clutches and brakes for switching among an infinitely variable transmission mode and a second operational mode of the power transmission apparatus,
   wherein said variator is a continuously variable planetary comprising an input ring, planetary balls, axles, an idler and an output ring.

2. The power transmission apparatus of claim 1, wherein a second planetary gear set is coaxially located and coupled to an output of the variator and to a final drive and differential.

3. The power transmission apparatus of claim 2, wherein the one or more clutches and brakes comprises an overdrive clutch for affecting a speed increase.

4. The power transmission apparatus of claim 2, wherein a variator output ring is coupled to a carrier of the second planetary gear set.

5. The power transmission apparatus of claim 2, wherein the second planetary can be locked to turn with a 1:1 ratio, or can provide a speed increase with an overdrive clutch.

6. The power transmission apparatus of claim 1, further comprising a traction fluid lubricant.

7. The power transmission apparatus of claim 1, wherein the first planetary gear set is further located between the variator and the power input shaft.

8. The power transmission apparatus of claim 1, wherein the power input shaft is connected to the sun of the first planetary gear set.

9. The power transmission apparatus of claim 1, wherein the one or more clutches and brakes are configured to be selectively engaged or released to switch among the infinitely variable transmission mode and the second operational mode of the power transmission apparatus.

10. The power transmission apparatus of claim 1, wherein the first planetary gear set comprises a ravigneaux gear set.

11. The power transmission apparatus of claim 1, wherein the first planetary gear set comprises a dual sun planetary gear set.

12. The power transmission apparatus of claim 11, wherein the dual sun planetary gearset comprises a first plane of gears including first planets, and a second plane of gears including second planets, wherein the first planets of the first plane of gears and the second planets of the second plane of gears are a single unit.

13. The power transmission apparatus of claim 11, wherein a variator input ring is coupled to the output sun of the first planetary gear set.

14. The power transmission apparatus of claim 1, further comprising a power output mechanically coupled to the variator, wherein the power output comprises an output gear set mechanically coupled to a shaft of the power output for transmitting power from the variator to a differential box.

15. The power transmission apparatus of claim 1, whereby the apparatus allows for mode shifting between the continuously variable mode and infinitely variable mode with a minimum number of clutches and brakes.

16. The power transmission apparatus of claim 1, wherein the first planetary gear set comprises a three sun planetary gear set.

17. The power transmission apparatus of claim 1 wherein the variator is coupled to a sun of the first planetary gear set.

18. The power transmission apparatus of claim 1, wherein the variator is coupled to a carrier of the first planetary gear set.

19. The power transmission apparatus of claim 1, wherein the variator comprises a continuously variable transmission.

20. The power transmission apparatus of claim 1, wherein the one or more clutches and brakes comprises a first clutch or brake for selecting an infinitely variable transmission mode of the power transmission apparatus.

21. The power transmission apparatus of claim 20, wherein the first clutch or brake is configured to couple to an output planet carrier of the first planetary gear set.

22. The power transmission apparatus of claim 20, wherein a second clutch or brake is configured to couple to a sun of the first planetary gear set.

23. The power transmission apparatus of claim 1, wherein the one or more clutches and brakes comprises a second clutch or brake for selecting a continuously variable transmission mode of the power transmission apparatus.

24. The power transmission apparatus of claim 23, wherein the second clutch or brake is configured to couple to an output of a sun gear of the first planetary gear set.

25. The power transmission apparatus of claim 1, wherein the one or more clutches and brakes comprises a third clutch or brake for selecting an infinitely and continuously variable transmission mode of the power transmission apparatus.

26. The power transmission apparatus of claim 25, wherein the third clutch or brake is configured to couple to a ring gear of the first planetary gear set.

27. The power transmission apparatus of claim 25, wherein the third clutch or brake is configured to couple to a sun of the first planetary gear set.

* * * * *

UNITED STATES PATENT AND TRADEMARK OFFICE
CERTIFICATE OF CORRECTION

| | | |
|---|---|---|
| PATENT NO. | : 9,052,000 B2 | Page 1 of 1 |
| APPLICATION NO. | : 14/017054 | |
| DATED | : June 9, 2015 | |
| INVENTOR(S) | : Kenneth E. Cooper | |

It is certified that error appears in the above-identified patent and that said Letters Patent is hereby corrected as shown below:

In the Specification:

Col. 3, Ln. 12; Replace (20040616399), with US 60/616,399

Signed and Sealed this
Twelfth Day of January, 2016

Michelle K. Lee
*Director of the United States Patent and Trademark Office*